(12) United States Patent
Ibuka et al.

(10) Patent No.: US 11,084,497 B2
(45) Date of Patent: Aug. 10, 2021

(54) VEHICLE CONTROL DEVICE

(71) Applicant: HONDA MOTOR CO., LTD., Tokyo (JP)

(72) Inventors: Jun Ibuka, Wako (JP); Jun Tanaka, Wako (JP); Takuyuki Mukai, Wako (JP); Shigehiro Honda, Wako (JP); Riho Harada, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 209 days.

(21) Appl. No.: 16/468,974

(22) PCT Filed: Dec. 14, 2016

(86) PCT No.: PCT/JP2016/087231
§ 371 (c)(1),
(2) Date: Jun. 12, 2019

(87) PCT Pub. No.: WO2018/109868
PCT Pub. Date: Jun. 21, 2018

(65) Prior Publication Data
US 2020/0079395 A1    Mar. 12, 2020

(51) Int. Cl.
*B60W 50/08* (2020.01)
*B60W 30/18* (2012.01)
(Continued)

(52) U.S. Cl.
CPC ...... *B60W 50/08* (2013.01); *B60W 30/18163* (2013.01); *G05D 1/0088* (2013.01);
(Continued)

(58) Field of Classification Search
CPC ........... B60W 60/005; B60W 60/0053; B60W 60/0059; B60W 60/0061; B60W 50/08;
(Continued)

(56) References Cited

U.S. PATENT DOCUMENTS

| | | | |
|---|---|---|---|
| 5,774,069 A | 6/1998 | Tanaka et al. | |
| 7,788,935 B2 * | 9/2010 | Jang | B60H 1/00864 62/150 |

(Continued)

FOREIGN PATENT DOCUMENTS

| | | |
|---|---|---|
| JP | H09-161196 A | 6/1997 |
| JP | 2000-306194 A | 11/2000 |

(Continued)

OTHER PUBLICATIONS

International Search Report (PCT/ISA/210) from International Application PCT/JP2016/087231 and the English translation thereof.

*Primary Examiner* — Peter D Nolan
*Assistant Examiner* — Kenneth M Dunne
(74) *Attorney, Agent, or Firm* — Carrier Blackman & Associates, P.C.; Joseph P. Carrier; Jeffrey T. Gedeon (57) ABSTRACT

The vehicle control device according to the present invention is a device that automatically controls the travel of a vehicle at least partially, the vehicle control device comprising: a traveling environment acquisition unit that acquires a traveling environment of the vehicle when the travel control is performed; and a vehicle control unit that performs state change control to change a state of the vehicle on the basis of the traveling environment acquired by the traveling environment acquisition unit, when the travel control is transitioned from automatic to manual or when such a transition is predicted.

10 Claims, 7 Drawing Sheets

(51) Int. Cl.
  *G05D 1/00* (2006.01)
  *B60W 50/00* (2006.01)
(52) U.S. Cl.
  CPC . *B60W 2050/0073* (2013.01); *B60W 2710/20* (2013.01); *B60W 2720/106* (2013.01); *G05D 2201/0213* (2013.01)
(58) Field of Classification Search
  CPC ... B60W 30/18163; B60W 2050/0073; B60W 2710/20; B60W 2720/106; G05D 1/0088; G05D 2201/00213
  See application file for complete search history.

(56) References Cited

U.S. PATENT DOCUMENTS

| | | | |
|---|---|---|---|
| 2012/0083960 A1* | 4/2012 | Zhu | G05D 1/0276 701/23 |
| 2015/0261219 A1* | 9/2015 | Cuddihy | B60J 1/2016 701/23 |
| 2015/0298695 A1 | 10/2015 | Kodaira | |
| 2016/0041553 A1 | 2/2016 | Sato et al. | |
| 2016/0378114 A1* | 12/2016 | Laur | B60W 60/0053 701/23 |
| 2017/0236210 A1* | 8/2017 | Kumar | G05D 1/0061 705/4 |
| 2017/0315556 A1* | 11/2017 | Mimura | G08G 1/167 |
| 2017/0368936 A1* | 12/2017 | Kojima | B60W 40/09 |
| 2018/0046185 A1* | 2/2018 | Sato | B60W 50/14 |
| 2018/0120844 A1* | 5/2018 | Okamoto | B60W 30/14 |

FOREIGN PATENT DOCUMENTS

| | | | | |
|---|---|---|---|---|
| JP | 2000306194 | * | 11/2000 | G08G 1/09 |
| JP | 2007199939 | * | 8/2007 | G08G 1/00 |
| JP | 2015-175824 A | | 10/2015 | |
| JP | 2016-038768 A | | 3/2016 | |
| WO | 2014/083631 A1 | | 6/2014 | |

* cited by examiner

VEHICLE CONTROL DEVICE

TECHNICAL FIELD

The present invention relates to a vehicle control device that performs travel control of a host vehicle at least partially automatically.

BACKGROUND ART

A vehicle control device that performs travel control of a host vehicle at least partially automatically has conventionally been known. For example, various timing control techniques for enabling smooth transition of a driving mode have been developed.

Japanese Laid-Open Patent Publication No. 09-161196 (paragraph [0005], etc.) has suggested a device that prompts a driver to perform an operation of changing a driving mode to request a takeover (takeover) from automated driving to manual driving.

Japanese Laid-Open Patent Publication No. 2015-175824 (paragraphs [0025], [0047], etc.) has suggested a system in which, if it has been determined that the travel by automated driving is impossible in a "suspension recommended" section where there is a reason of suspending the automated driving, the section is set to a "suspension" section where the automated driving is suspended and the travel is performed by the manual driving. One example of the suspension recommended section is a section under the weather where detection with a camera or a sensor is difficult in the vehicle travel.

SUMMARY OF INVENTION

However, for example, a driver may respond to the takeover request operation by a reflex action and perform the changing operation before the driver is prepared enough. In particular, if the vehicle travels in the suspension recommended section under the weather as described above, the driver may take time to recognize a travel environment and fail to perform a smooth driving operation immediately after the takeover.

The present invention has been made in order to solve the above problem, and an object is to provide a vehicle control device that enables smooth transition from automated driving to manual driving even under a particular travel environment.

A vehicle control device according to the present invention is a device configured to perform travel control of a host vehicle at least partially automatically and includes: a travel environment acquisition unit configured to acquire a travel environment of the host vehicle when the travel control is performed; and a vehicle control unit configured to perform state changing control for changing a state of the host vehicle when the travel control is taken over or predicted to be taken over from automated driving to manual driving, on a basis of the travel environment acquired by the travel environment acquisition unit.

By this configuration, when the travel control is taken over or predicted to be taken over from the automated driving to the manual driving, the host vehicle can adapt its state to the travel environment and even under a particular travel environment, the transition from the automated driving to the manual driving can be performed smoothly.

The travel environment acquisition unit may be configured to acquire the travel environment at a predicted point where the host vehicle is predicted to travel in future. Thus, if the takeover is performed at the predicted point, whether the state changing control is necessary can be known in advance.

The vehicle control device may further include an influence determination unit configured to determine an influence degree of the travel environment on a driver, wherein if the influence determination unit has determined that the influence degree is high, the vehicle control unit may be configured to perform the state changing control for changing the state to a state where the driver performs the manual driving easily. Thus, even if the influence degree of the travel environment on the driver is high, the driver can perform the manual driving in a state more suitable to the travel environment than before the state changing control is performed.

The influence determination unit may be configured to determine the influence degree on a basis of intensity of visual stimulus or audio stimulus applied to the driver, and the vehicle control unit may be configured to perform the state changing control for weakening the visual stimulus or audio stimulus relatively. Thus, the driver can perform the manual driving in the state where an external stimulus regarding a visual sense or a hearing sense is relieved compared to before the state changing control is performed.

The travel control may include inter-vehicle distance control for another vehicle near the host vehicle, and the vehicle control unit may be configured to perform the state changing control for setting an inter-vehicle distance between the host vehicle and the other vehicle to a value larger than a setting value in the inter-vehicle distance control in a case where the state changing control is not performed. Thus, the driver can perform the manual driving with safety margin secured preliminarily from the viewpoint of a relative position between the host vehicle and the other vehicle.

The travel control may include vehicle speed control for the host vehicle, and the vehicle control unit may be configured to perform, as the state changing control, the vehicle speed control for setting speed of the host vehicle to be lower than a setting value in the vehicle speed control in a case where the state changing control is not performed. Thus, the driver can perform the manual driving with the safety margin secured preliminarily from the viewpoint of relative speed between the host vehicle and the other vehicle.

The travel control may include accelerating control or decelerating control for the host vehicle, and the vehicle control unit may be configured to perform, as the state changing control, the accelerating control or the decelerating control for setting acceleration or deceleration of the host vehicle to be lower than a setting value in the accelerating control or the decelerating control in a case where the state changing control is not performed. Thus, the driver can perform the manual driving with the safety margin secured preliminarily from the viewpoint of an accelerating operation or a decelerating operation of the host vehicle.

The travel control may include lane changing control for the host vehicle, and if the host vehicle currently travels in a multilane road including a travel lane and an overtaking lane, the vehicle control unit may be configured to perform, as the state changing control, the lane changing control for changing a lane from the overtaking lane to the travel lane. Thus, the driver can perform the manual driving while traveling in the travel lane where many vehicles travel at relatively low speed.

The vehicle control device may further include a takeover request unit configured to perform a request operation for requesting a driver of the host vehicle to perform takeover to the manual driving, wherein the vehicle control unit may be configured to perform the state changing control before the takeover request unit performs the request operation. Thus, no matter when the driver performs the takeover in the request operation, the driver can start the manual driving in the state where the state of the host vehicle has been changed.

If the host vehicle has passed the predicted point but the takeover request unit has not yet performed the request operation, the vehicle control unit may be configured to cancel changing by the state changing control. Thus, since the takeover at the predicted point is no longer necessary, the state can be returned to the state suitable for the automated travel control.

If the host vehicle has traveled a predetermined distance since a starting time of the state changing control and/or a predetermined time has elapsed since the starting time but the takeover request unit has not yet performed the request operation, the vehicle control unit may be configured to cancel changing by the state changing control. Thus, since the takeover within the predicted distance range or time range is no longer necessary, the state can be returned to the state suitable for the automated travel control.

The vehicle control device may further include a takeover request unit configured to perform a request operation for requesting a driver of the host vehicle to perform takeover to the manual driving, wherein if the influence determination unit has determined that a state where the influence degree is high is canceled before the takeover is completed, the takeover request unit may be configured to stop the request operation. Thus, in a case where the influence degree later decreases, the automated driving can be continued and the driving becomes more convenient.

The vehicle control device may further include a takeover request unit configured to perform a request operation for requesting a driver of the host vehicle to perform takeover to the manual driving, wherein even if the influence determination unit has determined that a state where the influence degree is high is canceled before the takeover is completed, the takeover request unit may be configured to continue the request operation. Thus, it is possible to prevent an intermittent request operation from being performed if the influence degree has changed largely in a short time; accordingly, the driver does not feel a sense of discomfort.

By the vehicle control device according to the present invention, the transition from the automated driving to the manual driving can be performed smoothly even under the particular travel environment.

DESCRIPTION OF EMBODIMENTS

A preferred embodiment of a vehicle control device according to the present invention is hereinafter described with reference to the attached drawings.

[Configuration of Vehicle Control Device 10]

<Overall Configuration>

Figure 1:
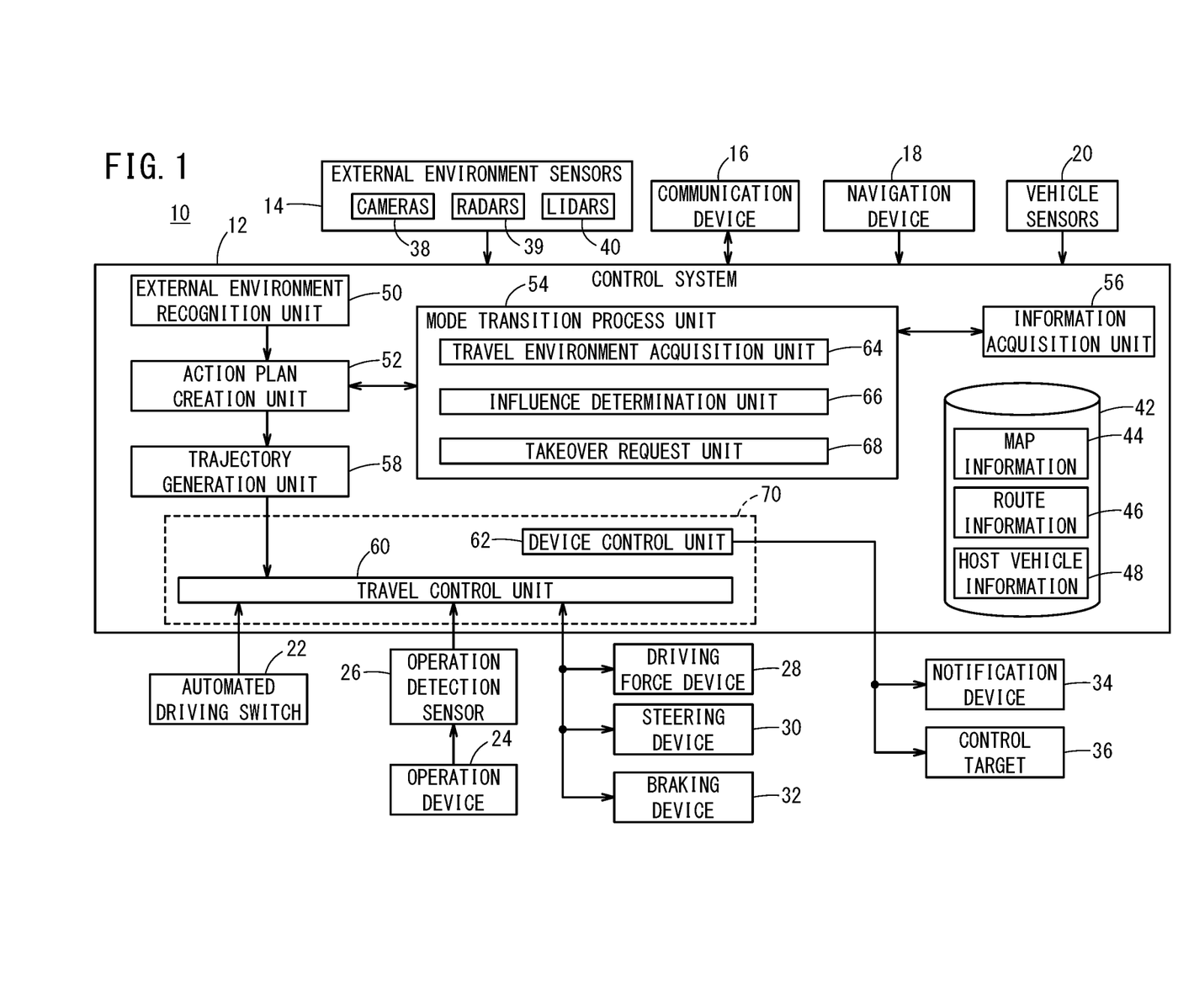
FIG. 1 is a block diagram illustrating a configuration of a vehicle control device according to one embodiment of the present invention.

FIG. 1 is a block diagram illustrating a configuration of a vehicle control device 10 according to one embodiment of the present invention. The vehicle control device 10 is incorporated in a vehicle (host vehicle 100 in FIG. 3, etc.), and performs travel control of the vehicle automatically or manually. This "automated driving" refers to a concept including not just "fully automated driving" in which the travel control of the vehicle is fully automated but also "partial automated driving" in which the travel control is partially automated.

The vehicle control device 10 basically includes an input system device group, a control system 12, and an output system device group. Devices in the input system device group and the output system device group are connected to the control system 12 through communication lines.

The input system device group includes external environment sensors 14, a communication device 16, a navigation device 18, vehicle sensors 20, an automated driving switch 22, and an operation detection sensor 26 connected to an operation device 24.

The output system device group includes a driving force device 28 that drives wheels that are not shown, a steering device 30 that steers the wheels, a braking device 32 that brakes the wheels, a notification device 34 that notifies a driver visually or audibly mainly, and a control target 36 in state changing control to be described below.

<Specific Configuration of Input System Device Group>

The external environment sensors 14 acquire information expressing an external environment state of the vehicle (hereinafter, external environment information), and outputs the external environment information to the control system 12. The external environment sensors 14 specifically include a plurality of cameras 38, a plurality of radars 39, and a plurality of LIDARs 40 (Light Detection and Ranging, Laser Imaging Detection and Ranging).

The communication device 16 is configured to be able to communicate with an external device including a road side machine, another vehicle, and a server. For example, the communication device 16 transmits and receives information regarding traffic equipment, information regarding other vehicles, probe information, or map information 44 that is the latest. This map information 44 is stored in a predetermined memory area in a storage device 42 or in the navigation device 18.

The navigation device 18 includes a satellite positioning device that can detect the current position of the vehicle, and a user interface (for example, a touch panel display, a speaker, and a microphone). The navigation device 18 calculates a route to a designated destination on the basis of the current position of the vehicle or the position designated by the user, and outputs the route to the control system 12. The route calculated by the navigation device 18 is stored as route information 46 in the predetermined memory area in the storage device 42.

The vehicle sensors 20 include a speed sensor that detects a speed V of the vehicle (vehicle speed), an acceleration sensor that detects acceleration, a lateral acceleration sensor that detects lateral acceleration, a yaw rate sensor that detects an angular speed around a vertical axis, an azimuth sensor that detects a direction/azimuth, and an inclination sensor that detects inclination. The vehicle sensors 20 output detection signals from these sensors to the control system 12. These detection signals are stored as host vehicle information 48 in the predetermined memory area in the storage device 42.

The automated driving switch 22 is, for example, a push button switch provided to an instrument panel. The automated driving switch 22 is configured to be able to change a plurality of driving modes through a manual operation of the user including the driver.

The operation device 24 includes an accelerator pedal, a steering wheel, a brake pedal, a shift lever, and a direction indicating lever. To the operation device 24, the operation detection sensor 26 is attached. The operation detection sensor 26 detects whether a driver's operation is performed, the operation amount, or an operation position.

The operation detection sensor 26 outputs the detection result to a travel control unit 60. The detection result is, for example, the accelerator stepping amount (accelerator opening), the steering operation amount (steering amount), the brake stepping amount, a shift position, a right/left turning direction, or the like.

<Specific Configuration of Output System Device Group>

The driving force device 28 includes a driving force ECU (Electronic Control Unit) and a driving source including an engine or a traction motor. The driving force device 28 generates travel driving force (torque) for the vehicle in accordance with a travel control value that is input from the travel control unit 60, and transmits the travel driving force to the wheels directly or through a transmission.

The steering device 30 includes an EPS (electric power steering system) ECU and an EPS device. The steering device 30 changes the direction of the wheels (steering wheels) in accordance with the travel control value that is input from the travel control unit 60.

The braking device 32 is, for example, an electric servo brake that is used in combination with a hydraulic brake, and includes a brake ECU and a brake actuator. The braking device 32 brakes the wheels in accordance with the travel control value that is input from the travel control unit 60.

The notification device 34 includes a notification ECU, a display device, and an audio device. The notification device 34 performs a notification operation (including TOR to be described below) regarding the automated driving or the manual driving in accordance with a notification instruction that is output from the control system 12 (specifically, the mode transition process unit 54).

The control target 36 is an operation target in the state changing control to be described below, and is, for example, a windshield wiper, a defroster (defogger), a lighting device, a shading device, or a driver's seat. The control target 36 may also serve as another configuration in the vehicle control device 10 (for example, the navigation device 18).

<Driving Mode>

Here, "the automated driving mode" and "the manual driving mode" (non-automated driving mode) are switched every time the automated driving switch 22 is pushed. Alternatively, to surely confirm the driver's intention, for example, the manual driving mode can be switched to the automated driving mode when the automated driving switch 22 is pushed twice, and the automated driving mode can be switched to the manual driving mode when the automated driving switch 22 is pushed once.

The automated driving mode is a driving mode in which the vehicle travels under control by the control system 12 in a state where the driver does not operate the operation device 24 (specifically, the accelerator pedal, the steering wheel, or the brake pedal). In other words, the automated driving mode is a driving mode in which the control system 12 controls the driving force device 28, the steering device 30, and the braking device 32 partially or entirely in accordance with an action plan that is created successively.

If the driver performs a predetermined operation with the operation device 24 in the automated driving mode, the automated driving mode is canceled automatically and switched to the driving mode with a relatively low driving automated level (including a manual driving mode). The driver's operation of the automated driving switch 22 or the operation device 24 for the transition from the automated driving to the manual driving is hereinafter also referred to as "takeover operation".

<Configuration of Control System 12>

The control system 12 is configured by one or a plurality of ECUs, and includes various function achievement units in addition to the storage device 42 described above. In this embodiment, the function achievement unit is a software function unit that achieves a function when one or a plurality of CPUs (central processing units) executes programs stored in the storage device 42 that is non-transitory. The function achievement unit may alternatively be a hardware function unit including an integrated circuit such as an FPGA (Field-Programmable Gate Array).

The control system 12 includes, in addition to the storage device 42 and the travel control unit 60, an external environment recognition unit 50, an action plan creation unit 52, the mode transition process unit 54, an information acquisition unit 56, a trajectory generation unit 58, and a device control unit 62.

The external environment recognition unit 50 recognizes lane marks (while lines) on both sides of the vehicle with reference to various pieces of information input from the input system device group (such as external environment information from the external environment sensors 14), and generates "static" external environment recognition information including positional information about a stop line and a traffic signal or a travel possible area. In addition, the external environment recognition unit 50 generates "dynamic" external environment recognition information including an obstacle such as a parked or stopped vehicle, a traffic participant such as a person or another vehicle, or the color of the traffic signal with reference to various pieces of information that are input.

The action plan creation unit 52 creates an action plan (events in time series) for each travel section on the basis of the recognition result from the external environment recognition unit 50, and updates the action plan as necessary. Examples of the kind of events include decelerating, accelerating, branching, merging, lane keeping, lane changing, and overtaking. Here, "decelerating" and "accelerating" are the events of decelerating and accelerating the vehicle, respectively. "Branching" and "merging" are the events of making the vehicle smoothly travel at a branch point and a merge point, respectively. "Lane changing" is the event of making the vehicle change the travel lane. "Overtaking" is the event of making the vehicle overtake the other vehicle ahead of the vehicle.

"Lane keeping" is the event of making the vehicle travel so as not to deviate from the travel lane, and is segmented depending on the combination with a travel mode. Specific examples of the travel mode include a constant-speed travel, a following travel, a decelerated travel, a curve travel, and an obstacle avoiding travel.

The mode transition process unit 54 performs a driving mode transition process and outputs a signal to the action plan creation unit 52 or the device control unit 62. Specifically, the mode transition process unit 54 functions as a travel environment acquisition unit 64, an influence determination unit 66, and a takeover request unit 68.

The information acquisition unit 56 acquires information necessary for a determination process for determining the influence of the travel environment on the driver. Specific examples of the necessary information include time information (such as current time, time band, expected arrival time), geographic information (such as latitude, altitude, height, topography, or difference of elevation), and weather information (such as weather, temperature, humidity, or weather forecast).

The trajectory generation unit 58 generates a travel trajectory (target behavior in time series) that follows the action plan created by the action plan creation unit 52 by using the map information 44, the route information 46, and the host vehicle information 48 read out from the storage device 42. This travel trajectory is a time-series data set whose data units are a position, a posture angle, speed, acceleration, a curvature, a yaw rate, and a steering angle.

The travel control unit 60 decides various travel control values for controlling the travel of the vehicle in accordance with the travel trajectory (target behavior in time series) generated by the trajectory generation unit 58. The travel control unit 60 outputs the obtained travel control values to the driving force device 28, the steering device 30, and the braking device 32.

The device control unit 62 controls the driving of the notification device 34 or the control target 36 in accordance with an instruction from the mode transition process unit 54. The travel control unit 60 and the device control unit 62 may be hereinafter referred to as a "vehicle control unit 70".

[Operation of Vehicle Control Device 10]
<Overall Procedure>

The vehicle control device 10 according to the present embodiment is configured as above. Next, an operation of the vehicle control device 10 (particularly, operation of the switching driving mode) is described mainly with reference to a flowchart in FIG. 2. Here, it is assumed that the host vehicle 100 including the vehicle control device 10 travels automatically or manually.

Figure 2:
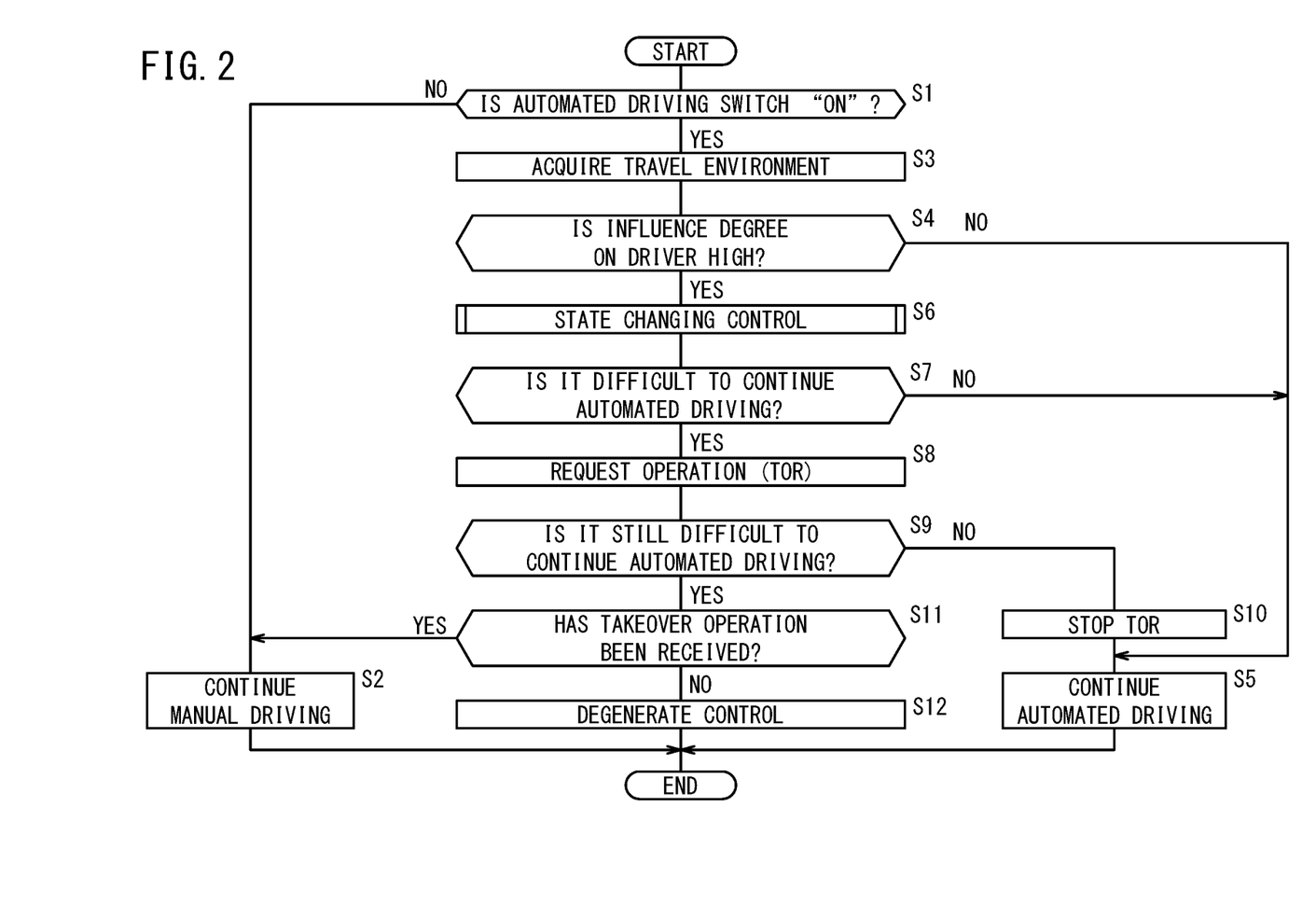
FIG. 2 is a flowchart for describing an operation of the vehicle control device illustrated in FIG. 1.

In step S1, the mode transition process unit 54 determines whether the automated driving mode (automated driving switch 22) is "on". If it has been determined that the automated driving mode is not "on" (is "off") (step S1: NO), the vehicle control device 10 continues the manual travel control of the host vehicle 100, that is, the manual driving (step S2). On the other hand, if it has been determined that the automated driving mode is "on" (step S1: YES), the process advances to step S3.

In step S3, the travel environment acquisition unit 64 acquires a travel environment of the host vehicle 100 at an arbitrary point where the host vehicle 100 is predicted to travel in the future (hereinafter, a predicted point 112 in FIG. 3). This travel environment includes the latest recognition result from the external environment recognition unit 50 or the acquired information from the information acquisition unit 56 (for example, time information, geographic information, or weather information described above).

In step S4, the influence determination unit 66 determines an influence degree expressing the influence of the travel environment acquired in step S3 on the driver. For example, the influence determination unit 66 may determine that the influence degree is high if a particular environment condition is satisfied and low if the particular environment condition is not satisfied. Here, "the particular environment condition" is, for example, a condition in which the continuation of the automated travel control is difficult because of dynamic or timely change of the natural environment (external stimulus) (specific example thereof is condition where backlight, dense fog, or icy road has occurred).

Figure 3:
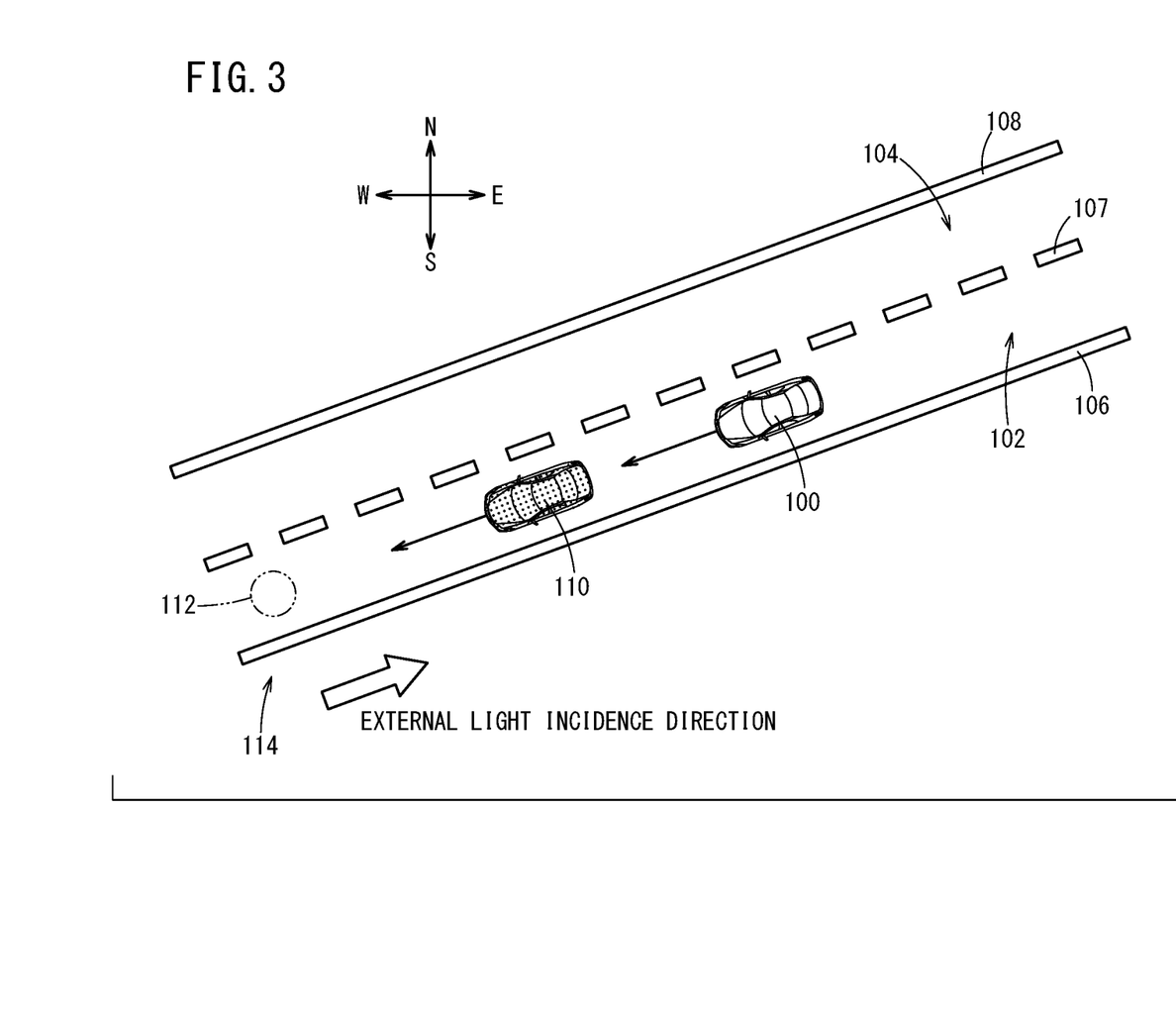
FIG. 3 is a schematic diagram illustrating one example of a determination process regarding an influence degree.

FIG. 3 illustrates a case in which the host vehicle 100 travels in a travel lane 102 that is straight. The travel lane 102 and an opposite lane 104 are sectioned by three lane marks 106, 107, 108. The lane marks 106, 108 are continuous lines, and the lane mark 107 is a dashed line.

This drawing illustrates the road in the country where vehicles should keep left, and another vehicle 110 travels in the same travel lane 102 ahead of the host vehicle 100. Here, the host vehicle 100 and the other vehicle 110 travel to the west-southwest (WSW).

In an example to be described below, the particular environment condition is "a backlighted state". The influence determination unit 66 predicts [1] the predicted point 112 and [2] a traveling direction of the host vehicle 100 having reached the predicted point 112, by using the map information 44, the route information 46, and the host vehicle information 48. This predicted point 112 is a position on a scheduled travel route where a request operation (TOR to be described below) or a takeover to the manual driving is predicted to be performed in the future.

In addition, the influence determination unit 66 predicts [3] an incidence direction of external light (sunlight) and [4] the intensity or illuminance of the external light, by using the time information (for example, year, month, day, and local time) and the geographic information (for example, latitude).

The influence determination unit 66 determines that the state is "a backlighted state" if the angle difference between the traveling direction of the host vehicle 100 (for example, west-southwest) and the external light incidence direction (for example, east-northeast corresponding to westering sun) is equal to or about 180°. On the other hand, if this angle difference is significantly different from 180°, the influence determination unit 66 determines that the state is not "the backlighted state".

The environment condition used in the determination process is not limited to the condition described above and may be combined with another constraint condition. Specifically, the constraint condition is, for example, [1] the weather is "fine", [2] the actually measured temperature or predicted temperature is higher than a threshold, [3] a tall object does not exist in a periphery 114 of the predicted point 112, [4] the predicted point 112 is an ascent with an inclination more than a threshold, or [5] the predicted point 112 is under an elevated road or at an exit of a tunnel.

With the use of a light detection device provided in the front of a vehicle body (specifically, cameras 38 and an illuminometer that is not shown), the intensity of the external light may be measured and this measurement result may be used in the determination process. For example, the influence determination unit 66 may analyze an imaging signal obtained by the cameras 38 and if saturation, flare, ghost, or smear has occurred, may determine that the state is "the backlighted state".

Instead of the determination method descried above (whether the condition is satisfied or not), the influence determination unit 66 may perform the threshold determination on the basis of which one is larger between the threshold and the influence degree that is expressed in quantity or numerals. If the travel environment is expressed in numerals (observation value or prediction value), for example, the values expressing the temperature, humidity, quantity of solar radiation, wind velocity, amount of rain, or water content of fog may be used to perform the threshold determination directly. Alternatively, the influence determination unit 66 may calculate the influence degree by the total scores resulting from various pieces of information (condition or numerals) in accordance with a predetermined criterion.

Back to FIG. 2, if it has been determined that the influence degree on the driver is not high (step S4: NO), the vehicle control device 10 continues the automated travel control of the host vehicle 100, that is, the automated driving (step S5). On the other hand, if it has been determined that the influence degree is high (step S4: YES), the process advances to step S6.

In step S6, the vehicle control unit 70 (specifically, the travel control unit 60) performs the state changing control for the driving force device 28, the steering device 30, the braking device 32, or the control target 36. Here, "state changing control" refers to the control for changing the state of the host vehicle 100 when the takeover from the automated travel control to the manual travel control is actually performed or predicted, more specifically, the control for constructing a driving environment for a driver to perform the manual driving easily (i.e., driver-friendly control).

Here, it should be noted that the vehicle control unit 70 performs the state changing control before the takeover request unit 68 performs the request operation (step S8 to be described below). Thus, no matter when the driver performs the takeover in the request operation, the driver can start the manual driving in the state where the state of the host vehicle 100 has been changed.

In step S7, the influence determination unit 66 determines whether it is difficult to continue the automated driving because the aforementioned influence degree is high. Here, the influence determination unit 66 performs the determination process that is the same as or different from that in step S4, and thus determines whether to continue the automated driving.

If it has been determined that continuing is not difficult (step S7: NO), the vehicle control device 10 continues the automated travel control of the host vehicle 100, that is, the automated driving (step S5). On the other hand, if it has been determined that continuing is difficult (step S7: YES), the process advances to step S8.

In step S8, the takeover request unit 68 performs the request operation for requesting the driver to perform the takeover (takeover) to the manual driving. The device control unit 62 having received the request operation (notification instruction) from the takeover request unit 68 instructs the notification device 34 to output. Then, the notification device 34, which is controlled by the device control unit 62, notifies the driver to perform the takeover. A series of these operations from the request operation to the notification operation may hereinafter be referred to as "TOR" (take over request).

The TOR terminating condition is, for example, [1] a predetermined time has elapsed since the starting time of the TOR, [2] the host vehicle 100 has traveled a predetermined distance since the starting time of the TOR, and [3] continuing the automated driving has become possible because of the later decrease of the aforementioned influence degree.

In step S9, the influence determination unit 66 determines whether it is still difficult to continue the automated driving. Here, the influence determination unit 66 determines the continuation of the state by performing a determination process that is the same as or different from that in step S7.

If it has been determined that it is no longer difficult to continue (step S9: NO), the takeover request unit 68 stops the TOR (step S10) and then, the vehicle control device 10 continues the automated travel control of the host vehicle 100, that is, the automated driving (step S5).

Here, if the influence determination unit 66 has determined that the high influence degree state is canceled or ended before the takeover is completed, the takeover request unit 68 may stop the request operation. Thus, in the case where the influence degree later decreases, the automated driving can be continued and the driving becomes more convenient.

On the other hand, if the influence determination unit 66 has determined that it is still difficult to continue the automated driving (step S9: YES), the process advances to step S11.

In step S11, the vehicle control unit 70 determines whether the takeover operation of the driver has been received. It the takeover operation has been received (step S11: YES), the vehicle control device 10 makes a transition to the manual driving and then the manual travel control is continued (step S2). On the other hand, if the takeover operation has not been received (step S11: NO), the process advances to step S12.

Figure 6A:
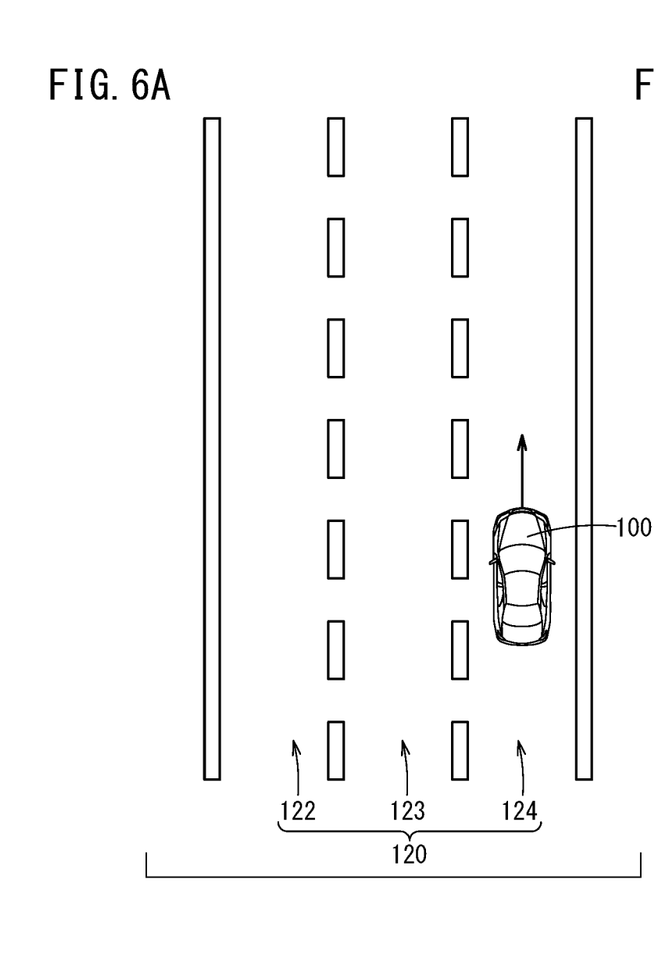
FIG. 6A is a diagram illustrating the travel state of the host vehicle in the normal time during the automated driving.
Figure 6B:
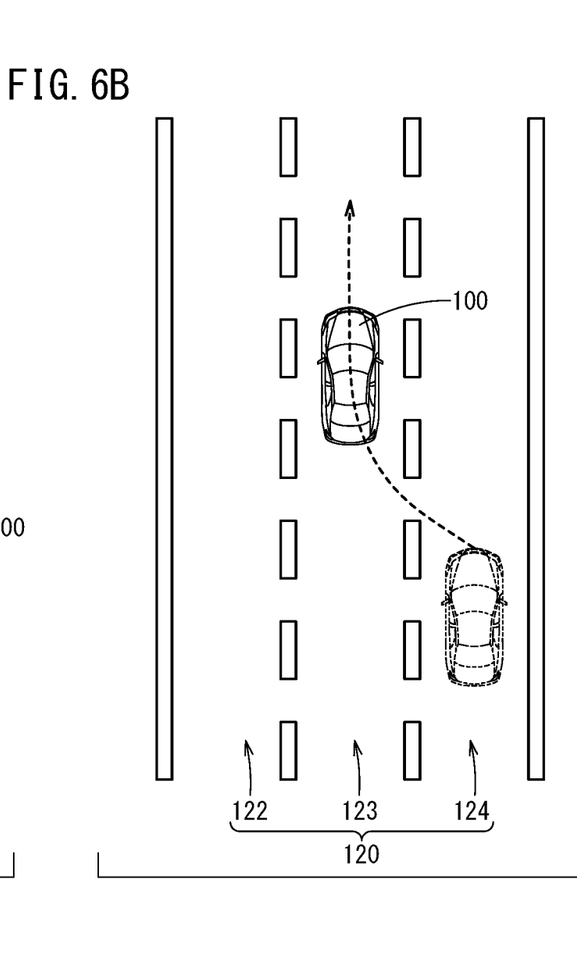
FIG. 6B is a diagram illustrating the travel state of the host vehicle with the state changing control.

In step S12, for example, the vehicle control unit 70 performs at least one control (i.e., degenerate control) of [1] lighting control of hazard lights, [2] decelerating control of the host vehicle 100, [3] steering or stopping control for stopping the host vehicle 100 at a road shoulder of the travel lane 102, [4] keeping the stop state, and [5] lane changing in a highway road (see FIG. 6A and FIG. 6B).

Example of Operation by State Changing Control

First Example

Figure 4:
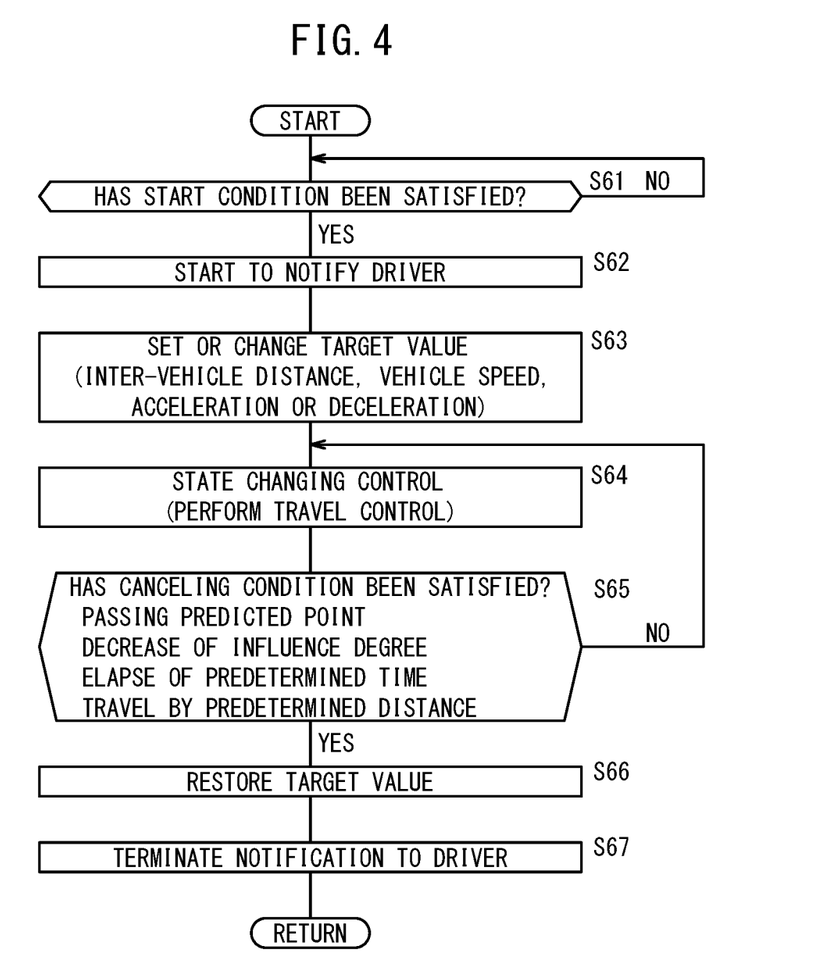
FIG. 4 is a detailed flowchart regarding state changing control (step S6 in FIG. 2)

Subsequently, a first example of the state changing control (step S6 in FIG. 2) is described in detail with reference to a flowchart in FIG. 4. Note that this state changing control, which is triggered by the starting (S6) in FIG. 2, is performed in parallel to the flowchart in FIG. 2 (step S7 and after that).

In the case to be described below, it is assumed that the current action plan is "lane keeping (following travel or constant-speed travel)", the target value of an inter-vehicle distance D is D1, and the target value of the speed V is V1.

Figure 5A:
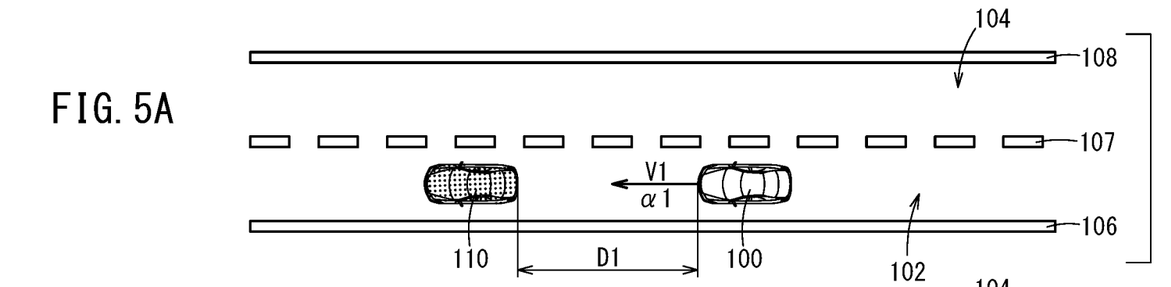
FIG. 5A is a diagram illustrating a travel state of a host vehicle in a normal time during automated driving.

As illustrated in FIG. 5A, the host vehicle 100 travels with the inter-vehicle distance D between the host vehicle 100 and the preceding other vehicle 110 kept at "D1" in the normal time during the automated driving (inter-vehicle distance control). In addition, in the normal time during the automated driving (vehicle speed control), the host vehicle 100 travels with the speed V kept at "V1".

In step S61, the mode transition process unit 54 determines whether a start condition for the state changing control has been satisfied. This start condition is, for example, [1] it is very likely that the host vehicle 100 passes the predicted point 112, [2] the host vehicle 100 is in a predetermined distance range from the predicted point 112, or [3] the host vehicle 100 can reach the predicted point 112 within a predetermined time range.

In step S62, the device control unit 62 having received the start instruction from the mode transition process unit 54 instructs the notification device 34 to output. Then, the notification device 34, which is controlled by the device control unit 62, starts the notification operation for the driver. Thus, the notification device 34 outputs a message like "prepare for the driving" with text or audio.

In step S63, the control system 12 sets or changes the target value regarding the travel control. Specifically, the mode transition process unit 54 notifies the action plan creation unit 52 that the state changing control is started. Then, the action plan creation unit 52 updates the target value of the inter-vehicle distance D to D2 (>D1) and/or the target value of the speed V to V2 (<V1).

In step S64, the travel control unit 60 performs the travel control of the host vehicle 100 in accordance with the setting value that is changed in step S63. Prior to this control, the trajectory generation unit 58 generates the travel trajectory that enables the host vehicle 100 to travel following the other vehicle 110 with the target value of the inter-vehicle distance D (or speed V) set to D2 (or V2). Thus, the host vehicle 100 travels along the travel trajectory generated by the trajectory generation unit 58.

In step S65, the mode transition process unit 54 determines whether a canceling condition for the state changing control has been satisfied. If it has been determined that the canceling condition has not been satisfied (step S65: NO), the process returns to step S64 and then, steps S64 and S65 are repeated sequentially. As a result, the host vehicle 100 exhibits the travel behavior with the setting change of the target value (step S63) reflected properly as time passes.

Figure 5B:
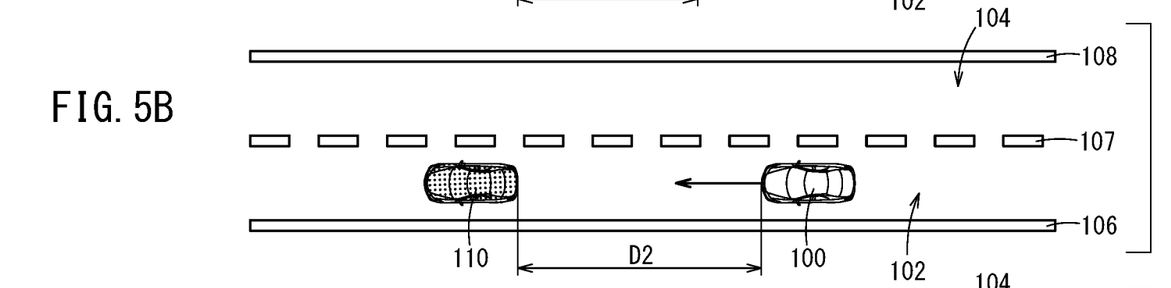
FIG. 5B and FIG. 5C are diagrams each illustrating the travel state of the host vehicle with the state changing control.

As illustrated in FIG. 5B, the host vehicle 100 travels with the inter-vehicle distance D between the host vehicle 100 and the preceding other vehicle 110 kept at "D2" as the state changing control is performed. Here, since D2>D1 is satisfied, the safety margin is secured in the driving environment of the host vehicle 100 more than in the normal time of the automated driving (before the state changing control is performed).

Thus, in one embodiment of the travel control, the vehicle control unit 70 may perform the inter-vehicle distance control for the other vehicle 110 near the host vehicle 100 as the state changing control in the following manner: the inter-vehicle distance D between the host vehicle 100 and the other vehicle 110 is set to the value (D2) larger than the setting value (D1) in the inter-vehicle distance control in a case where the state changing control is not performed. Thus, the driver can start the manual driving with the safety margin secured preliminarily from the viewpoint of the relative position between the host vehicle 100 and the other vehicle 110.

Figure 5C:
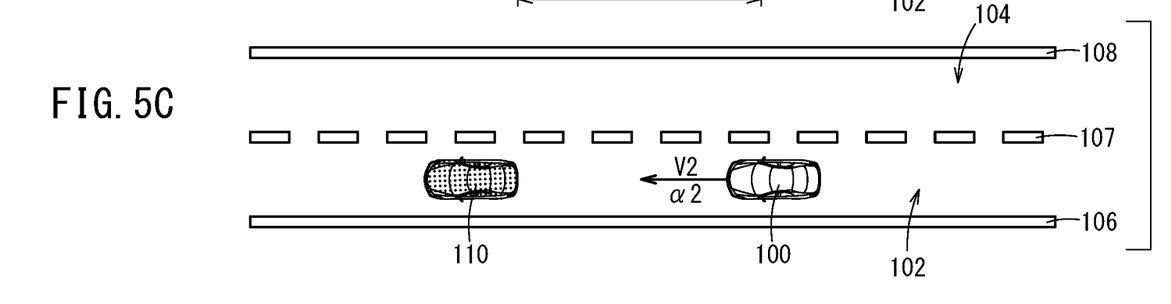

As illustrated in FIG. 5C, the host vehicle 100 travels with the speed V kept at "V2" as the state changing control is performed. Here, since V2<V1 is satisfied, the safety margin is secured in the driving environment of the host vehicle 100 more than in the normal time of the automated driving (before the state changing control is performed).

Thus, in one embodiment of the travel control, the vehicle control unit 70 may perform the vehicle speed control for the host vehicle 100 as the state changing control in the following manner: the speed V of the host vehicle 100 is set to the value (V2) smaller than the setting value (V1) in the vehicle speed control in the case where the state changing control is not performed. Thus, the driver can start the manual driving with the safety margin secured preliminarily from the viewpoint of the relative speed between the host vehicle 100 and the other vehicle 110.

In the example described above, the current action plan is "lane keeping"; however, the present invention is similarly applicable to the action plan of "accelerating" or "decelerating". For example, the host vehicle 100 travels with acceleration or deceleration $\alpha$ kept at "$\alpha$1" in the normal time during the automated driving (accelerating control or decelerating control) (see FIG. 5A). Note that the acceleration or deceleration $\alpha$ corresponds to the acceleration if $\alpha$>0 and corresponds to the deceleration if $\alpha$<0.

As the state changing control is performed, the host vehicle 100 travels with the acceleration or deceleration $\alpha$ kept at "$\alpha$2" (see FIG. 5C). Here, since $|\alpha 2|<|\alpha 1|$ is satisfied, the safety margin is secured in the driving environment of the host vehicle 100 more than in the normal time during the automated driving (before the state changing control is performed).

Thus, in one embodiment of the travel control, the vehicle control unit 70 may perform the accelerating control for the host vehicle 100 as the state changing control in the following manner: the acceleration or deceleration ($\alpha$) of the host vehicle 100 is set to the value ($\alpha$2) smaller than the setting value ($\alpha$1) in the accelerating control in the case where the state changing control is not performed.

Similarly, in one embodiment of the travel control, the vehicle control unit 70 may perform the decelerating control for the host vehicle 100 as the state changing control in the following manner: the deceleration ($-\alpha$) of the host vehicle 100 is set to a value ($-\alpha$2) smaller than a setting value ($-\alpha$1) in the decelerating control in the case where the state changing control is not performed.

Back to step S65, if the mode transition process unit 54 has determined that the canceling condition for the state changing control has been satisfied (step S65: YES), the process advances to step S66.

In step S66, the control system 12 restores the target value regarding the travel control. Specifically, the mode transition process unit 54 notifies the action plan creation unit 52 to cancel the state changing control. Then, the action plan creation unit 52 updates the target value of the inter-vehicle distance D from D2 to D1 and/or the target value of the speed V from V2 to V1.

In step S67, the device control unit 62 having received a terminating instruction from the mode transition process unit 54 instructs the notification device 34 to output. Then, the notification device 34, which is controlled by the device control unit 62, terminates the notifying operation for the driver.

Incidentally, the canceling condition for the state changing control is that, for example, [1] the host vehicle 100 has passed the predicted point 112, [2] the influence degree on the driver is predicted to be lower (lower than the aforementioned threshold) when the host vehicle 100 passes the predicted point 112, [3] the host vehicle 100 has traveled the predetermined distance since the starting time of the state changing control, or [4] the predetermined time has elapsed since the starting time of the state changing control.

In this manner, if the host vehicle 100 has passed the predicted point 112 but the takeover request unit 68 has not yet performed the request operation, the vehicle control unit 70 may cancel changing by the state changing control. Thus, since the takeover at the predicted point 112 is no longer necessary, the state can be returned to the state suitable for the automated travel control.

If the host vehicle 100 has traveled the predetermined distance since the starting time of the state changing control and/or the predetermined time has elapsed since the starting time of the state changing control but the takeover request unit 68 has not yet performed the request operation, the vehicle control unit 70 may cancel changing by the state changing control. Thus, since the takeover within the predicted distance range or time range is no longer necessary, the state can be returned to the state suitable for the automated travel control.

Second Example

Subsequently, a second example of the state changing control (step S6 in FIG. 2) is described with reference to FIG. 6A and FIG. 6B. FIG. 6A is a diagram illustrating the travel state of the host vehicle 100 in the normal time during the automated driving. FIG. 6B is a diagram illustrating the travel state of the host vehicle 100 with the state changing control.

In the example illustrated in FIG. 6A, it is assumed that the host vehicle 100 currently travels in a multilane road 120 with three lanes on one side. This multilane road 120 includes a travel lane 122, a travel lane 123, and an overtaking lane 124 in the order from the left. For example, it is assumed that the current action plan is "lane keeping (constant-speed travel)" and the host vehicle 100 currently travels in the overtaking lane 124.

Here, before the state changing control is performed, the mode transition process unit 54 notifies the action plan creation unit 52 to change the lane. As the action plan is changed, the trajectory generation unit 58 generates the travel trajectory for changing the lane from the overtaking lane 124 to the travel lane 123. Thus, through the travel control by the travel control unit 60, the host vehicle 100 travels following the travel trajectory generated by the trajectory generation unit 58.

As illustrated in FIG. 6B, the host vehicle 100 changes the lane along the trajectory indicated by a dashed arrow as the state changing control is performed and then, the host vehicle 100 travels while keeping the state of "constant-speed travel".

Thus, in one embodiment of the travel control, the vehicle control unit 70 may perform the lane changing control for the host vehicle 100 as the state changing control in the following manner: if the host vehicle 100 currently travels in the multilane road 120 including the travel lanes 122, 123 and the overtaking lane 124, the lane is changed from the overtaking lane 124 to the travel lane 123. Thus, the driver can start the manual driving while traveling in the travel lane 123 where many vehicles travel at relatively low speed.

Third Example

Although the first example and the second example describe the travel control for the host vehicle 100 for securing "the safety margin", the mode and purpose of the state changing control are not limited to the aforementioned ones. Specifically, the state changing control may be the control for operating the control target 36 in order to prevent the decrease in the driver's "cognitive ability".

For example, [1] the vehicle control unit 70 (specifically, the device control unit 62) may secure the driver's viewing field by operating the windshield wiper or the defroster as the control target 36. Alternatively, [2] the device control unit 62 may reduce the light quantity in the driver's viewing field by operating the driver's seat or the shading device as the control target 36.

[3] The device control unit 62 may decrease the brightness (illuminance) of the lighting device as the control target 36 so that the driver can see the external environment more easily. Alternatively, [4] the device control unit 62 may decrease the brightness/volume of the audio/video device as the control target 36, so that the driver can see or hear the external environment more easily.

In this manner, the influence determination unit 66 may determine the influence degree on the basis of the intensity of the visual stimulus or audio stimulus for the driver, and the vehicle control unit 70 may perform the state changing control for weakening the visual stimulus or audio stimulus relatively. Thus, the driver can perform the manual driving in the state where the external stimulus regarding the visual sense or the hearing sense is relieved compared to before the state changing control is performed.

[Another Example of Operation of Vehicle Control Device 10]

Figure 7:
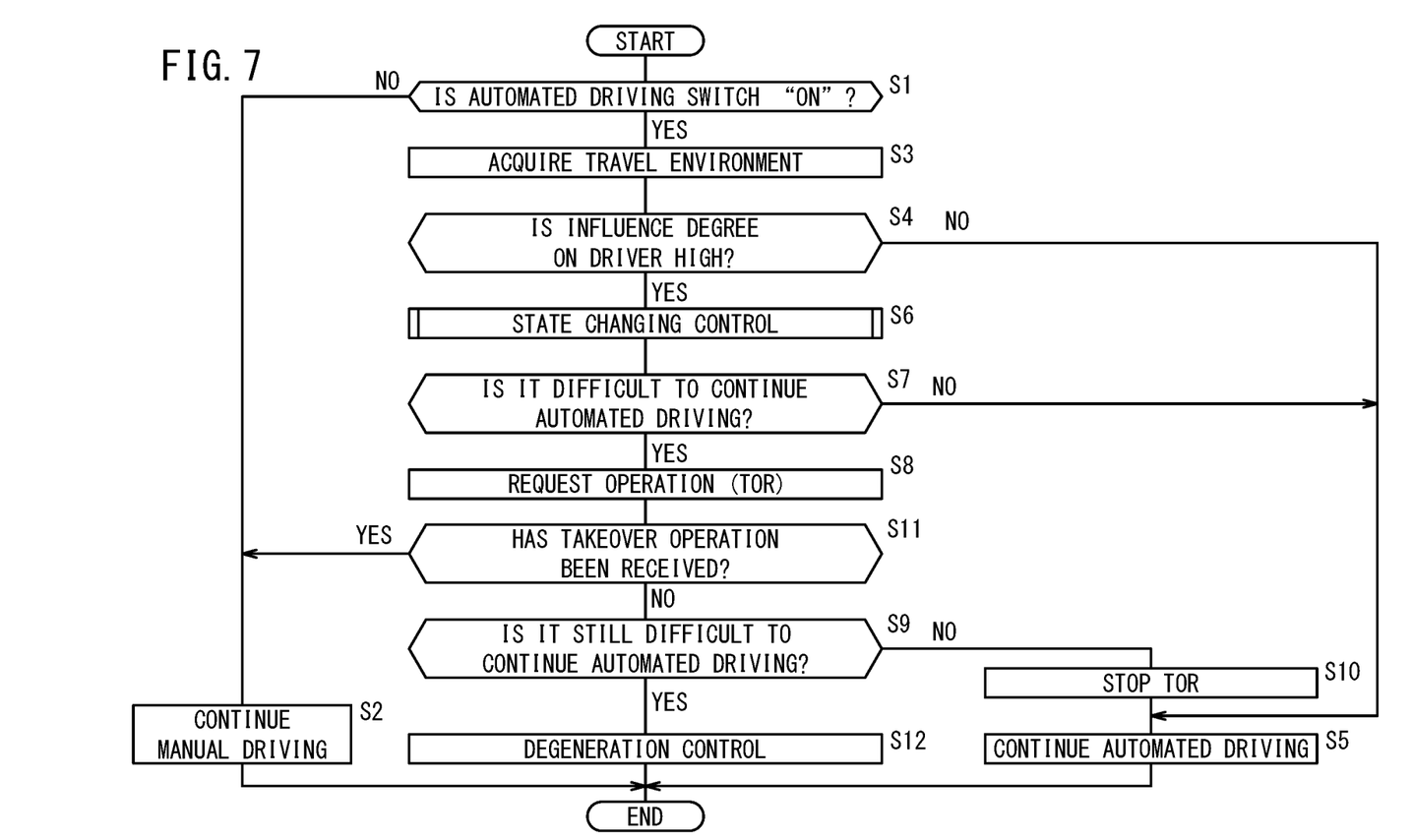
FIG. 7 is a flowchart illustrating an example different from that in FIG. 2.

FIG. 7 is a flowchart showing an example different from that in FIG. 2. As is understood from this drawing, this flowchart is different from the flowchart in FIG. 2 in that step S9 and step S11 are performed in the opposite order. In this case, the takeover request unit 68 continues the request operation until the takeover operation is received regardless of whether the influence degree has changed or how much the influence degree has changed (step S11).

Thus, even if the influence determination unit 66 has determined that the higher influence degree state is canceled or ended before the takeover is completed, the takeover request unit 68 may continue the request operation. Therefore, it is possible to prevent the intermittent request operation from being performed if the influence degree has changed largely in a short time; accordingly, the driver does not feel a sense of discomfort.

[Effect of this Vehicle Control Device 10]

As described above, the vehicle control device 10 is the device configured to perform the travel control of the host vehicle 100 at least partially automatically, and includes: [1] the travel environment acquisition unit 64 configured to acquire the travel environment of the host vehicle 100 when the travel control is performed; and [2] the vehicle control unit 70 configured to perform the state changing control for changing the state of the host vehicle 100 when the travel control is taken over or predicted to be taken over from the automated driving to the manual driving on the basis of the acquired travel environment.

In addition, in a vehicle control method using the vehicle control device 10, one or a plurality of processing devices performs: [1] an acquisition step (S3) of acquiring the travel environment of the host vehicle 100 when the travel control is performed; and [2] a control step (S6) of performing the state changing control for changing the state of the host vehicle 100 when the travel control is taken over or predicted to be taken over from the automated driving to the manual driving on the basis of the acquired travel environment.

By this configuration, when the travel control is taken over or predicted to be taken over from the automated driving to the manual driving, the host vehicle 100 can adapt its state to the travel environment and even under the particular travel environment, the transition from the automated driving to the manual driving can be performed smoothly.

In addition, the travel environment acquisition unit 64 may acquire the travel environment at the predicted point 112 where the host vehicle 100 is predicted to travel in the future. Thus, if the takeover is performed at the predicted point 112, whether the state changing control is necessary can be known in advance.

The vehicle control device 10 may further include the influence determination unit 66 configured to determine the influence degree of the travel environment on the driver. If it has been determined that the influence degree is high, the vehicle control unit 70 may perform the state changing control for changing the state to the state where the driver can perform the manual driving easily. Thus, even if the influence degree of the travel environment on the driver is high, the driver can perform the manual driving in the state more suitable to the travel environment than before the state changing control is performed.

[Supplement]

The present invention is not limited to the embodiment described above, and can be changed freely within the range not departing from the concept of the present invention. Alternatively, the configurations can be combined arbitrarily within the range not contradicting each other technically.

The invention claimed is:

1. A vehicle control device configured to perform travel control of a host vehicle at least partially automatically, comprising one or more processors that execute computer-executable instructions stored in a memory, wherein the one or more processors execute the computer-executable instructions to cause the vehicle control device to:
   acquire a travel environment of the host vehicle when the travel control is performed;
   perform state changing control for changing a state of the host vehicle when the travel control is taken over or predicted to be taken over from automated driving to manual driving, on a basis of the travel environment; and
   perform a request operation for requesting a driver of the host vehicle to perform takeover to the manual driving,
   wherein the one or more processors acquire the travel environment at a predicted point where the host vehicle is predicted to travel in future,
   wherein the one or more processors perform the state changing control before the takeover request unit performs the request operation, and
   wherein if the host vehicle has passed the predicted point but the takeover request unit has not yet performed the request operation, the vehicle control unit is configured to cancel changing by the state changing control.

2. The vehicle control device according to claim 1, wherein the one or more processors determine an influence degree of the travel environment on a driver,
   wherein if the one or more processors have determined that the influence degree is high, the one or more processors perform the state changing control for changing the state to a state where the driver performs the manual driving easily.

3. The vehicle control device according to claim 2, wherein:
   the one or more processors determine the influence degree on a basis of intensity of visual stimulus or audio stimulus applied to the driver; and
   the one or more processors perform the state changing control for weakening the visual stimulus or audio stimulus relatively.

4. The vehicle control device according to claim 2, wherein if the one or more processors have determined that a state where the influence degree is high is canceled before the takeover is completed, the one or more processors stop the request operation.

5. The vehicle control device according to claim 2, wherein even if the one or more processors have determined that a state where the influence degree is high is canceled before the takeover is completed, the one or more processors continue the request operation.

6. The vehicle control device according to claim 1, wherein:
   the travel control includes inter-vehicle distance control for another vehicle near the host vehicle; and
   the one or more processors perform the state changing control for setting an inter-vehicle distance between the host vehicle and the other vehicle to a value larger than a setting value in the inter-vehicle distance control in a case where the state changing control is not performed.

7. The vehicle control device according to claim 1, wherein:
   the travel control includes vehicle speed control for the host vehicle; and
   the one or more processors perform, as the state changing control, the vehicle speed control for setting speed of the host vehicle to be lower than a setting value in the vehicle speed control in a case where the state changing control is not performed.

8. The vehicle control device according to claim 1, wherein:
   the travel control includes accelerating control or decelerating control for the host vehicle; and
   the one or more processors perform, as the state changing control, the accelerating control or the decelerating control for setting acceleration or deceleration of the host vehicle to be lower than a setting value in the accelerating control or the decelerating control in a case where the state changing control is not performed.

9. The vehicle control device according to claim 1, wherein:
   the travel control includes lane changing control for the host vehicle; and
   if the host vehicle currently travels in a multilane road including a travel lane and an overtaking lane, the one or more processors perform, as the state changing control, the lane changing control for changing a lane from the overtaking lane to the travel lane.

10. A vehicle control device configured to perform travel control of a host vehicle at least partially automatically, comprising one or more processors that execute computer-executable instructions stored in a memory, wherein the one or more processors execute the computer-executable instructions to cause the vehicle control device to:
    acquire a travel environment of the host vehicle when the travel control is performed;
    perform state changing control for changing a state of the host vehicle when the travel control is taken over or predicted to be taken over from automated driving to manual driving, on a basis of the travel environment; and
    perform a request operation for requesting a driver of the host vehicle to perform takeover to the manual driving,
    wherein the one or more processors acquire the travel environment at a predicted point where the host vehicle is predicted to travel in future, wherein the one or more processors perform the state changing control before the takeover request unit performs the request operation, and wherein if the host vehicle has traveled a predetermined distance since a starting time of the state changing control and/or a predetermined time has elapsed since the starting time but the one or more processors have not yet performed the request operation, the one or more processors cancel changing by the state changing control.

* * * * *